United States Patent [19]
Bell

[11] Patent Number: 4,944,644
[45] Date of Patent: Jul. 31, 1990

[54] SCREW FASTENER CAP

[75] Inventor: Alan Bell, Glasgow, Scotland

[73] Assignee: Steelpress (Supplies) Limited, Glasgow, Scotland

[21] Appl. No.: 106,689

[22] Filed: Oct. 13, 1987

[30] Foreign Application Priority Data

Oct. 11, 1986 [GB] United Kingdom ................. 8624427
Dec. 31, 1986 [GB] United Kingdom ................. 8631093

[51] Int. Cl.⁵ ..................... F16B 19/00; F16B 33/00; F16B 43/00
[52] U.S. Cl. .................... 411/372; 411/375; 411/431; 10/86
[58] Field of Search ............................. 411/371–373, 411/375, 377, 429–431, 910, 480, 369, 542; 10/86 C

[56] References Cited

U.S. PATENT DOCUMENTS

| | | | |
|---|---|---|---|
| 3,485,134 | 12/1969 | Ott | 411/372 |
| 4,373,842 | 2/1983 | Bettini et al. | 411/377 |
| 4,460,300 | 7/1984 | Bettini et al. | 411/375 |
| 4,576,533 | 3/1986 | Chartier | 10/86 C |
| 4,749,321 | 6/1988 | Knohl et al. | 411/377 |

FOREIGN PATENT DOCUMENTS

| | | | |
|---|---|---|---|
| 525053 | 12/1953 | Belgium | 411/373 |
| 1116444 | 6/1968 | United Kingdom | 411/373 |

Primary Examiner—Neill R. Wilson
Attorney, Agent, or Firm—Mason, Fenwick & Lawrence

[57] ABSTRACT

A cover cap is provided for a screw fastener device of the type comprising a threaded shank and a head, with washer means below said head, said washer means including a rigid spreader washer located over a resilient washer part. The screw fastener device is especially intended to secure panelling, such as roof and wall cladding, in industrial and domestic buildings. The cover cap comprises a cap member for location over the fastener head, a peripheral wall of the cap member sealingly engaging said resilient washer part. Further the cap includes clip means for clipping to the fastener device below the rigid spreader washer to secure the cap on the screw fastener device. The clip means preferably comprises an annular series of indents, but alternatively the annular wall could include a peripheral skirt of indented U-form defining said clip means.

13 Claims, 4 Drawing Sheets

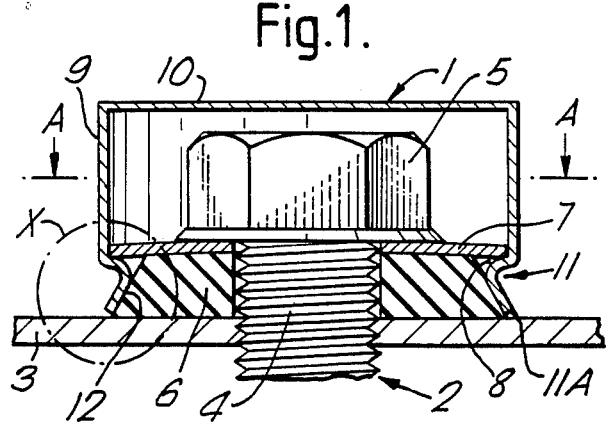
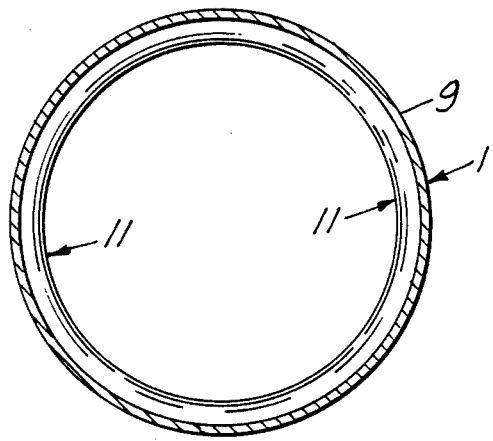
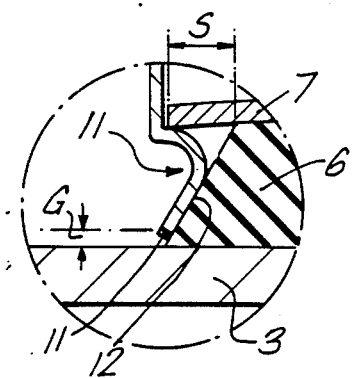
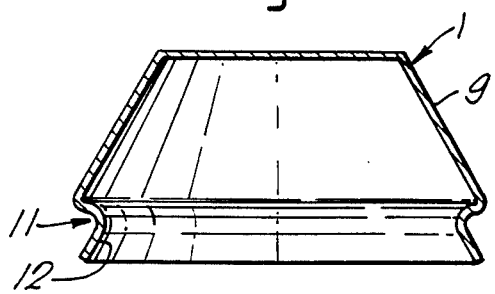

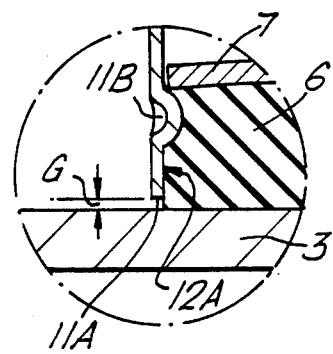
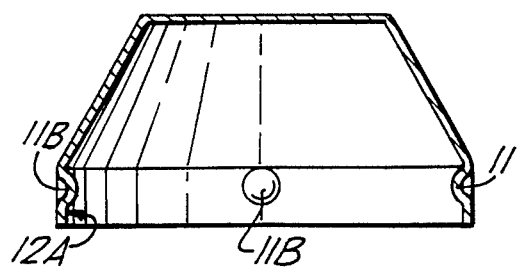
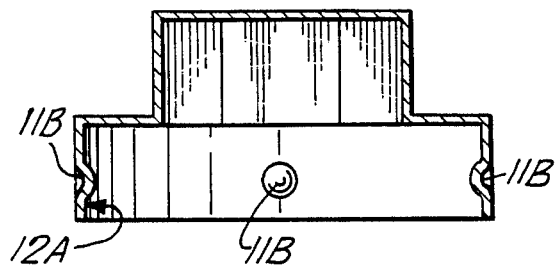
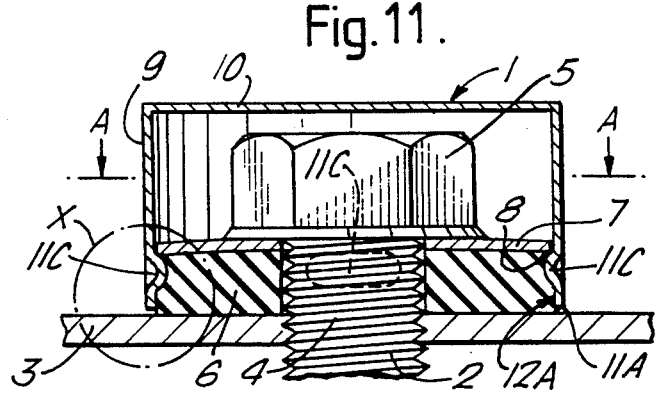

SCREW FASTENER CAP

DESCRIPTION

The present invention relates to screw fasteners serving to secure panelling, and in particular cladding used in roof and wall constructions in industrial and domestic buildings. More specifically, the present invention relates to caps for use with such screw fasteners.

Screw fasteners for securing cladding are known and comprise a threaded shank with head of square of polygonal form to facilitate screwing down of the fastener in the cladding for securement, and the fastener additionally includes a washer arrangement comprising a resilient sealing washer connected to a metal spreader washer part located above the sealing washer. For aesthetic requirements a cover cap has been fitted over the head part of the fastener, the cap usually of plastic material having a colour matching that of the cladding. This cap which essentially provided only a cosmetic function has a cylindrical portion surrounding the washer arrangement and a head which was a frictional fit on the fastener head. The cap was therefore only frictionally secured on the fastener and there was the disadvantage that there could be an undesired loss of caps since the caps could be rather easily removed even by virtue of thermal expansion effects in the cap head in hot weather. Rainwater could also enter under the cap and thus enter down the shank of the fastener causing water leakage into the buildings.

It is an object of the present invention to obviate or mitigate these disadvantages.

According to the present invention there is provided a cover cap for fitting to a screw fastener device which device comprises a fastener element including a threaded shank and a head part, first washer means located under the head part; and a resilient second-washer located below the first washer means; said cover cap comprising a cap member for location over said head part of the screw fastener element, said cap member including a closed top and an annular wall for location around said washer means, and an indent means arranged around the periphery of said annular wall, said indent means being arranged for location below the first washer means to secure the cover cap in position on the screw fastener device, said annular wall including a peripheral skirt below said indent means for engagement with a peripheral portion of said resilient second-washer, the lower edge of said peripheral skirt being located above the level of the bottom edge of the uncompressed resilient second-washer, when the cap cover is fitted to a said screw fastener device.

Preferably the first washer means comprises a separate rigid washer part, preferably made of metal.

Preferably the indent means extends 360° around the annular wall of the cap.

In an alternative embodiment, the indent means comprises at least two indents on said annular wall adapted to grip said second resilient water. Each indent can be of part spherical form, or alternatively of elongate form.

The present invention is also a screw fastener device fitted with the above cover cap in accordance with the present invention.

The cap can be made of the same material as the cladding to be fastened and can have the same colour as the cladding. It is generally preferable therefore that the cap is made of metal. With the above prior art plastics cap there could be different weathering rates between the cladding and the cap, and further the plastics cap can show colour fading by virtue of ultra violet light degredation. Over a period of time a serious loss of aesthetic quality can result. The present invention enables convenient material/colour matching between the cladding and the cap so that this problem can be overcome or substantially reduced.

Embodiments of the present invention will now be described by way of example with reference to the accompanying drawings wherein:

FIG. 1 shows a cross-sectional side view of a screw fastener serving to secure cladding and provided with a cap in accordance with the present invention;

FIG. 2 shows a plan view of the cap in FIG. 1 through section A—A of FIG. 1;

FIG. 3 shows the detail X of FIG. 1 to a larger scale;

FIGS. 4, 5 show in cross-sectional side elevation different shapes of cap satisfying the present invention.

FIG. 8 shows the detail X of FIG. 6 to a larger scale;

FIGS. 9 and 10 show sectional elevations of further embodiments;

Figure 12:
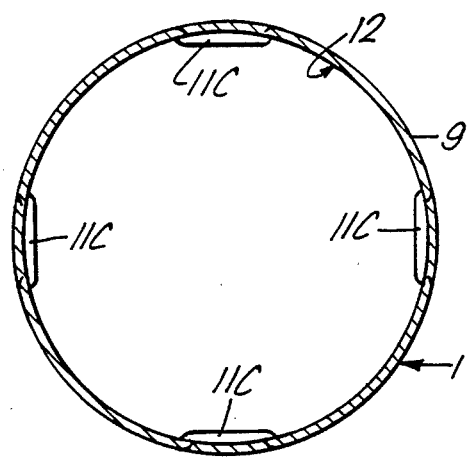
Figure 13:
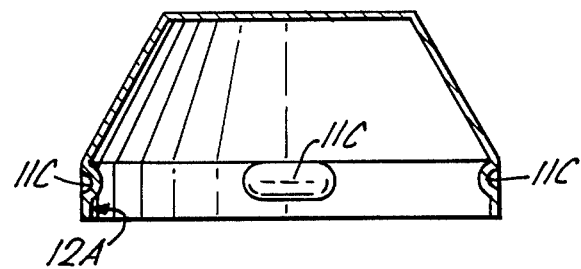
Figure 14:
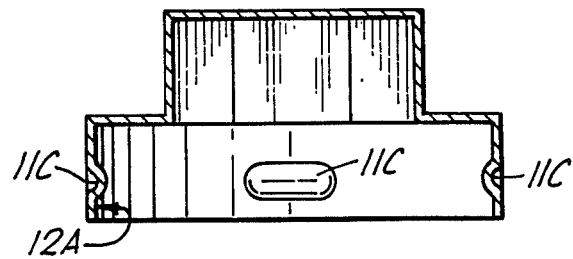

FIGS. 11 and 12 show sectional elevation and plan views respectively of yet a further embodiment; and FIGS. 13 and 14 show the embodiment of FIGS. 9 and 10 modified per FIG. 11.

Referring to FIGS. 1 to 3, a cover cap 1 is provided for a screw fastener 2 serving to secure profile seal cladding 3 for example to a beam or column in roof or wall constructions in buildings. The screw fastener 2 which may be of steel or other metal, possibly suitably coated, comprises a threaded shank 4, preferably self tapping, having a hexagonal head 5 facilitating screwing of the fastener 2 into a receiving bore of the cladding 3. To convenience fitting the shank 4 can have its nose fashioned as a drill (not shown). The fastener 2 further includes a resilient sealing washer 6 of rubber or synthetic material and a metal spreader washer 7 between the resilient washer 6 and the fastener head 5. It is a feature of this arrangement that the peripheral edge of the resilient washer 6 is set back by a suitable distance S (see FIG. 3) from the edge of the metal washer 7 in the non-compressed condition (ie. that of washer 7) so that when the fastener 2 is fitted and the washer 6 compressed a peripheral shoulder is formed at the outer edge of the washers 6, 7. The distance S may have any suitable value eg. about 1–2 mm.

The cap 1 comprises a cylindrical body part 9 closed at its upper end by top 10 and having a diameter slightly greater than the washer 7 so as to be fittable thereover. The bottom end of the body part 9 is shaped as a circumferential resilient clip or catch in the form of a U-shaped indent. The cap 1 can be made of metal or synthetic plastics material, but for metal cladding 3 eg. aluminum there are benefits in having the cap 1 material and colour matched with the cladding for the reasons explained above ie. the cap could be made of the same aluminium material as the cladding.

In use the cap 1 is fitted when the tightening and securing operations of the fastener 2 with respect to the cladding 3 are complete: at this stage the resilient washer 6 is sealingly compressed but nevertheless the peripheral shoulder 8 is still present. The cap 1 is then simply fitted by snap fitting on the fastener's head the catch 11 firstly defecting outwardly and then snapping into a mechanical locking relationship with the shoulder 8 as shown in FIG. 1. A fair degree of force may be required to push the cap 1 downwardly into the "locked" condition, but once the cap is locked in position it will be extremely difficult to remove the cap especially without the use of a suitable removal tool. It could be disadvantageous if the bottom cap 11A of the catch were to overfirmly engage the cladding 3 since this could adversely affect the locking action of the catch 11: consequently it is beneficial if the appropriate parts are dimensioned so that a clearance G (FIG. 3) is present between the cap 11A and the cladding 3 when the cap 1 is fitted. A further significant feature is that the inner edge of the U-shaped indent engages the periphery of the washer 6 in a tight sealing manner so preventing ingress of water to the metal head 5 and metal washer 7. The cap 1 can be made of thin gauge metal for example 3-2 mm thick. The cap diameter will be dependent on that of the washer 7 but may be 10 mm or more.

Figure 5:
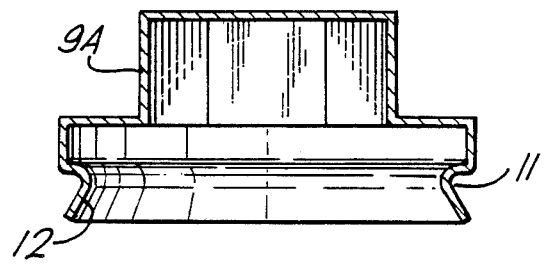

The use of different coloured caps provides economies vis-a-vis fasteners with different permanent coloured heads since only the same standard stock of fasteners need be used for a wide variety of cladding—different colours and materials of this cladding can be catered for by the relatively cheaper caps. It will be understood that the cross-sectioned end profile of the cap could vary and FIGS. 4 and 5 show possible variations. Thus in FIG. 4 the body part 9 is of a frusto-conical form while in FIG. 5 a hollow base part 9A is present to closely fit over the fastener head 5. Other variations are possible: for example, instead of a 360° continuous catch 11 as shown a set of separate spaced catches could be used but in this case the sealing performance of the cap may be considerably reduced.

Figure 6:
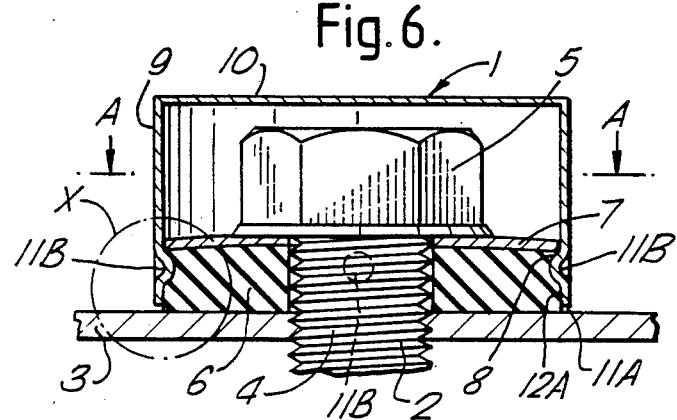
FIG. 6 shows a sectional elevation of a cap fitted to a screw fastener, in accordance with a further embodiment of the present invention.
Figure 7:
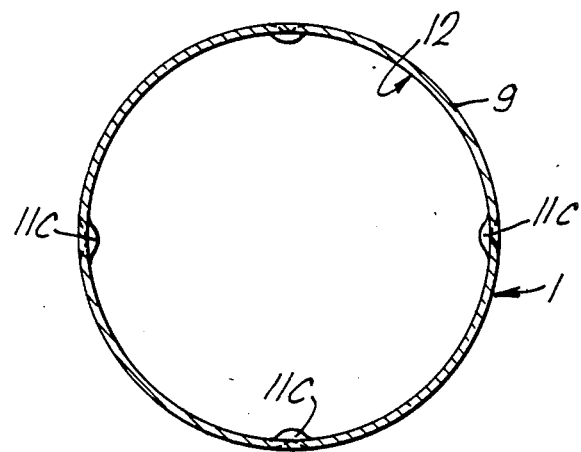
FIG. 7 shows a plan view of the cap of FIG. 6 through section A—A in FIG. 6.

The cap/fastener shown in FIGS. 6 and 7 are similar to the cap/fastener shown in FIGS. 1 to 3 and similar parts carry similar reference numerals. However, instead of the 360° cap clip 11 shown in FIGS. 1 to 3, four annularly spaced indents 11B are now provided on the peripheral cap wall 9 but, as can be seen, spaced from the bottom edge 11A of the wall 9. The indents 11B are of part spherical form and as will be appreciated there could be more than four indents or alternatively only three or even two may suffice.

In use, the rubber or synthetic washer 6 will have a diameter closely approximating to tha of the fastener's metal washer 7 and when the washer 6 is depressed due to tightening of the fastener the washer 6 will expand laterally so as to project radially slightly beyond the metal washer 7. As previously, the cap 1 is fitted onto the fastener head by a snap action, and the fitted cap 1 is secured by virtue of the indents 11B gripping the washer 6 and by the indents 11B being located under the metal washer 7 as can be clearly seen in FIG. 8. The inner surface 12A of wall 9 sealingly engages the periphery of the washer 6 to preclude ingress of moisture via the shank 4, even although the bottom edge 11A of the cap is spaced by a distance G from the wall 3.

FIGS. 9 and 10 show the provision of the indents 11A in screw fasteners caps of different cross-sectional profile, but operating in the same way as in the FIGS. 6/7 cap. Instead of a part-spherical indent 11B, the indents may be of elongate or oblong form 11C as shown in FIGS. 11 to 14. Again, the caps of FIGS. 6 to 14 are preferably made of metal eg. steel, and could be suitably coated.

I claim:

1. A cover cap fitting to a screw fastener device which device comprises a fastener element including a threaded shank and a head part, first washer means located under the head part; and a resilient second-washer located below the first washer means; said cover cap comprising a cap member for location over said head part of the screw fastener element, said cap member including a closed top and an annular wall for location around said washer means, and indent means arranged around the periphery of said annular wall, said indent means being arranged for location below the first washer means to secure the cover cap in position on the screw fastener device, said annular wall including a peripheral skirt below said indent means for engagement with a peripheral portion of said resilient second-washer, the lower edge of said peripheral skirt being located above the level of the bottom edge of the uncompressed resilient second-washer, when the cap cover is fitted to a said screw fastener device.

2. A cover cap as claimed in claim 1, wherein the indent means comprises at least two indents on said annular wall adapted to grip said resilient second washer.

3. A cover cap as claimed in claim 1, wherein the indent means comprises a continuous circumferential indent sealingly engaging the resilient second washer.

4. A cover cap as claimed in claim 1, wherein said first washer means comprises a rigid washer.

5. A cover cap as claimed in claim 12, wherein the indents are each of part spherical form.

6. A cover cap as claimed in claim 2, wherein each indent is of elongate form.

7. A cover cap as claimed in claim 1, wherein the cap is made of metal.

8. A cover cap as claimed in claim 1, wherein said annular wall comprises a cylindrical wall portion.

9. A cover cap as claimed in claim 1, wherein said closed top comprises a hexagonal portion to fit closely on a hexagonal head part of the fastener device.

10. A cover cap as claimed in claim 1, wherein said annular wall comprises a frusto-conical portion.

11. A fastener comprising in combination a screw fastener device and a cover cap for the screw fastener device; said screw fastener device comprising a fastener element having a threaded shank, a head part and first washer means below said head part, and a resilient second washer located below the first washer means; said cover cap comprising a cap member for location over said head part of the fastener element, said cap member including a closed top and an annular wall for location around said first washer means, and indent means arranged around the periphery of said annular wall, said indent means being arranged for location below the first washer means to secure the cover cap in position on the screw fastener device, said annular wall including a peripheral skirt below said indent means for engagement with a peripheral portion of said resilient second-washer, the lower edge of said peripheral skirt being located above the level of the bottom edge of the uncompressed resilient second-washer, when the cap cover is fitted to the screw fastener device.

12. The combination as claimed in claim 11, wherein the indent means comprises at least two indents on said annular wall adapted to grip said resilient second washer.

13. The combination as claimed in claim 11, wherein the indent means comprises a continuous circumferential indent sealingly engaging the resilient second washer.

* * * * *